Oct. 11, 1966 E. V. HENC 3,277,764
APPARATUS FOR WORKING CORRUGATED BOARD OR THE LIKE
Filed Sept. 9, 1964 2 Sheets-Sheet 1
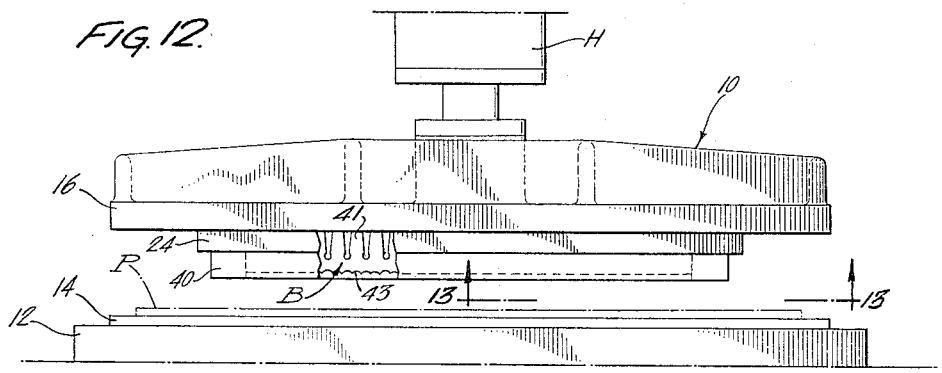
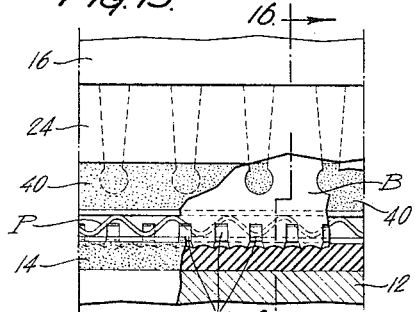
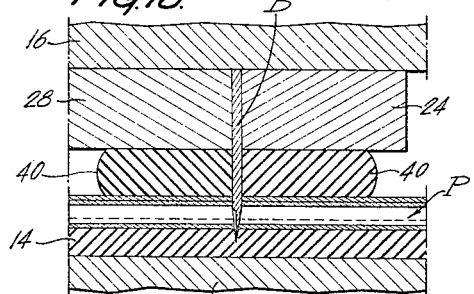
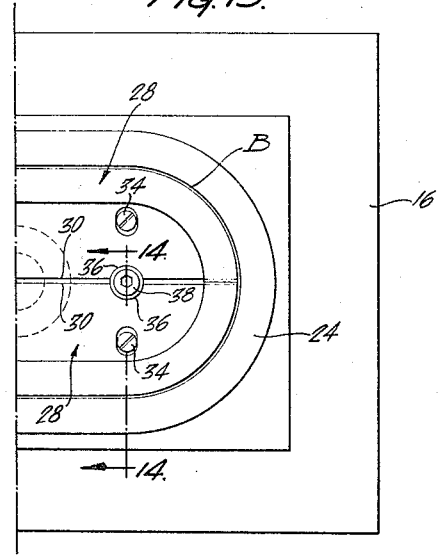
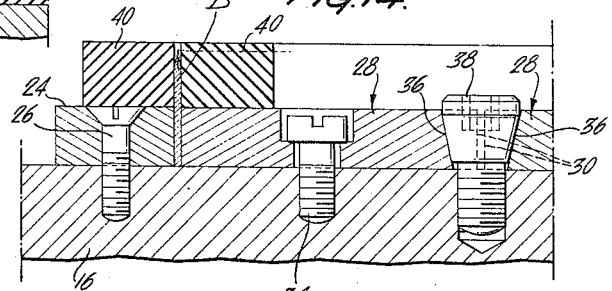
INVENTOR:
EDWARD V. HENC
BY Howson & Howson
ATTYS.

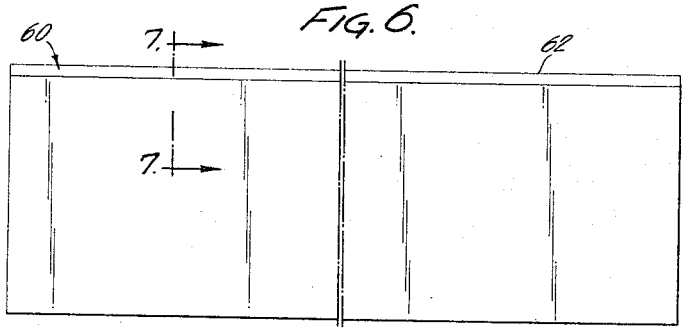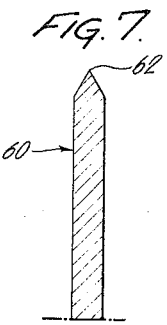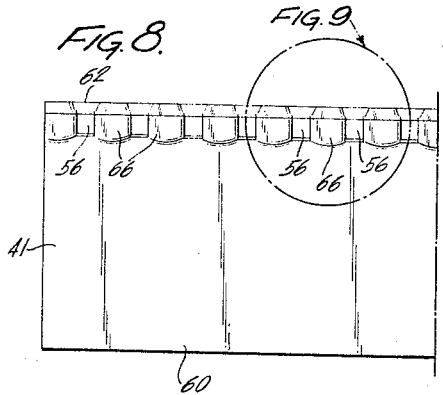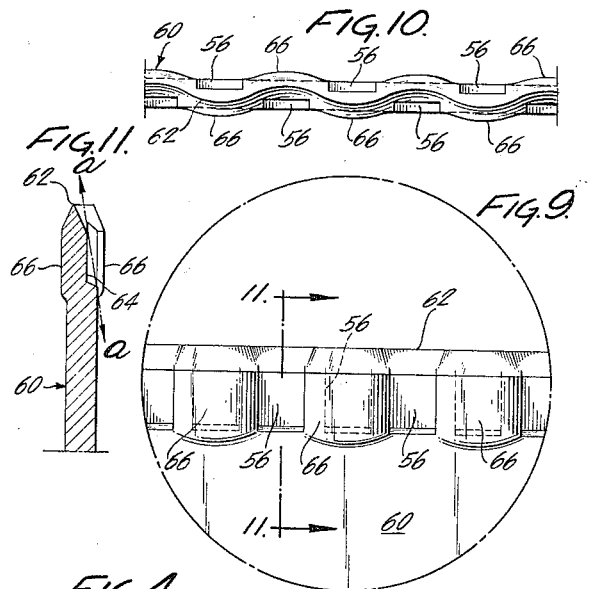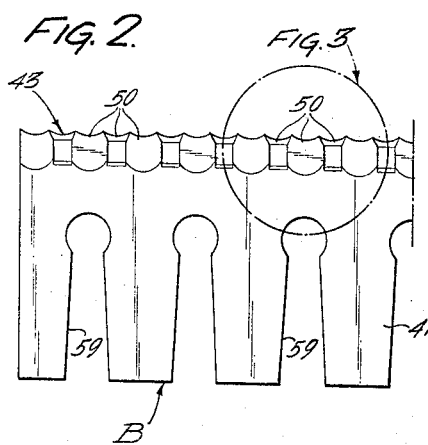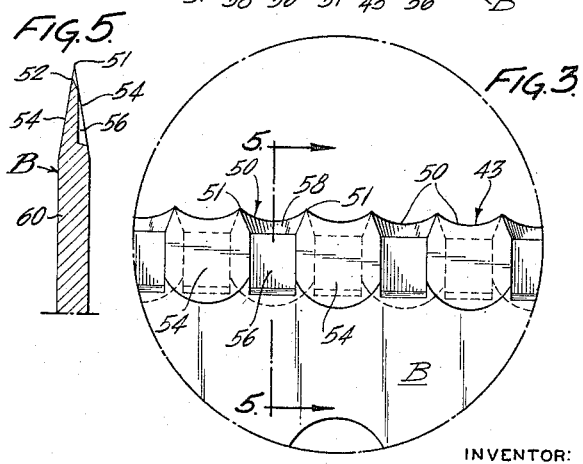

United States Patent Office 3,277,764
Patented Oct. 11, 1966

3,277,764
APPARATUS FOR WORKING CORRUGATED
BOARD OR THE LIKE
Edward V. Henc, 302 Netherington Drive, Broomall, Pa.
Filed Sept. 9, 1964, Ser. No. 395,175
6 Claims. (Cl. 83—679)

This invention relates to improvements in apparatus for handling sheet material such as corrugated board or the like.

More particularly the invention relates to an improved cutting blade for use in apparatus for performing cutting and blanking or like operations on sheet material such as corrugated board or the like to form therefrom blanks from which finished articles may be made.

One such apparatus for performing cutting and blanking operations on corrugated board or the like is an offset press having a movable platen mounting a flat rule blade and a steel bed plate on which the sheet material, for example, corrugated board, is supported. As is conventional, the platen is cycled to cut or blank sheet material fed to the apparatus. This type of rule blade requires constant resharpening and has a relatively short life due to engagement thereof with the steel bed plate.

It has been proposed to provide in this type of apparatus a serrated cutting blade of triangular pyramidal tooth shape and to provide a resilient anvil made for example of rubber on the bed plate which supports the work piece and into which the cutting blade penetrates during the cutting or blanking operation. These serrated cuting blades have not proven entirely satisfactory. For example, it has been found that fibers from the corrugated board tend to compact in the throat or neck of the teeth thereby developing fissures or small openings in the blade which attract more fibers and eventually result in failure of the blade. Thus, for this reason the life of the blade is limited and requires frequent replacement. Additionally, it has been found that the serrated cutting blade does not shear all the fibers of the board cleanly and tends to impregnate some into the resilient anvil. Accordingly, over a comparatively short period of use, the anvil becomes swelled with entrapped fibers thereby requiring replacement. This necessitates shut down of the apparatus, which of course, is expensive and replacement of the resilient anvil which is also costly. Moreover, gradual swelling of the anvil produces an uneven support surface for the corrugated board thereby resulting in a slight deviation in the finished pattern of the blank from the desired pattern. Furthermore, it has been found that blanks produced with the rule blade and also the serrated blade are characterized by a sharp edge which presents a hazard to personnel handling the blank.

The present invention provides a cutting blade for apparatus for forming corrugated board which is characterized by novel features of construction and arrangement and which obviates the problems of the former types of cutting blades discussed above. In accordance with the present invention the cutting blade is characterized by a plurality of teeth each tooth comprising in profile an arcuate cutting edge terminating at opposite ends in a sharp point where it merges with adjacent teeth. The cutting blade further is defined by one generally flat tapered side face and a generally rectangular cutout in its opposite side face which has a slanted or tapered edge of a shorter depth and a more severe taper than the one tapered side face. The cutting blade also includes a plurality of keyhole slots below the cutting edge to facilitate bending of the blade to any desired shape for use in apparatus for cutting or blanking corrugated board or the like. The cutting blade of the present invention overcomes the disadvantages of prior blades used in apparatus of the above type and also solves the problems encountered therewith. For example, with the blade of the present invention, the fibers of the corrugated board are cut cleanly and the problem of embedding of fibers in the resilient anvil is practically eliminated. Furthermore, since the edge of the blade in profile has a gentle arcuate peak and valley configuration, there is no problem of fissures developing in the sharp valleys of the pyramidal toothed serrated blade mentioned above. Thus the life of the blade and the resilient anvil are extened considerably thereby minimizing the amount of downtime heretofore required for replacement of the blade and the resilient anvil. Moreover, the blade of the present invention provides a slightly undulating edge of the corrugated board which is not extremely sharp and thereby does not present a hazard to personnel handling the paper board. The undulations are ever so slight and accordingly, are not objectionable from the standpoint of appearance.

With the foregoing in mind, an object of the present invention is to provide an improved cutting blade for apparatus for cutting or blanking corrugated board or the like which is characterized by novel features of construction and arrangement, is of relatively simplified construction, is easily and economically manufactured and is extremely effective for the purposes intended.

These and other objects of the present invention and the various features and details of the construction of a cutting blade in accordance with the present invention are hereinafter more fully set forth with reference to the accompanying drawings, wherein:

FIG. 1 is a fragmentary perspective view of a cutting blade in accordance with the present invention;

FIG. 2 is a side elevational view illustrating a portion of the blade for apparatus for cutting and/or blanking sheet material such as corrugated board;

FIG. 3 is an enlarged fragmentary view showing the encircled portion of the blade of FIG. 2;

FIG. 4 is an enlarged plan view of the cutting edge of the blade;

FIG. 5 is an enlarged sectional view taken on lines 5—5 of FIG. 3;

FIG. 6 is a side elevational view of the blade at initial stage of production thereof;

FIG. 7 is an enlarged fragmentary sectional view taken on lines 7—7 of FIG. 6;

FIG. 8 is a fragmentary side view of the blade in an intermediate stage in the making thereof;

FIG. 9 is an enlarged blown up view of the encircled portion shown in FIG. 8;

FIG. 10 is an enlarged plan view of the top of the blade shown in FIG. 9;

FIG. 11 is an enlarged sectional view taken on lines 11—11 of FIG. 9;

FIG. 12 is a fragmentary view of a die press employing a cutting blade constructed in accordance with the present invention;

FIG. 13 is a fragmentary view of the movable platen of the die press as viewed from lines 13—13 of FIG. 12;

FIG. 14 is an enlarged sectional view taken on lines 14—14 of FIG. 13;

FIG. 15 is a fragmentary view partly in section showing the platen in a lowered position engaging a workpiece along the anvil of the die press of FIG. 12; and FIG. 16 is an enlarged sectional view taken on lines 16—16 of FIG. 15.

Referring now to the drawings there is shown in FIG. 12 apparatus for cutting and blanketing sheet material such as corrugated board or the like embodying a cutting blade in accordance with the present invention. In the present instance the apparatus illustrated is a die press 10. Even though the present invention is illustrated and described in connection with a die press, it is, of course, to be understood that the cutting blade may be used in other types of apparatus for cutting and blanking corrugated board or the like.

The die press illustrated includes a stationary bed plate 12 having an anvil 14 mounted thereon for supporting a workpiece, the anvil 14 being of a resilient material such as rubber. The die press further includes a platen 16 which mounts the cutting blade B. The platen is adapted to be actuated into and out of engagement with a workpiece P by means of a hydraulic actuator H.

In the present instance, the cutting blade B defines an oval, as illustrated for example in FIG. 13, to cut out an oval shaped blank. However, the blade B may be of any configuration to cut a variety of patterns in a workpiece P. As best illustrated in FIGS. 13 and 14, the cutting blade B is supported on the face of the platen 16 confronting the stationary bed plate 12 by means including an oval shaped ring member 24 secured to the platen by means of screws 26, the ring member 24 completely surrounding the outer periphery of the blade as illustrated. The cutting blade B is held against the ring 24 by means including in the present instance a pair of retaining members 28, 28 having straight confronting side edges 30 and a rounded outer peripheral edge pressing against the blade B against the inner periphery of the ring member 24. The retaining members 28, 28 are secured to the platen by means including a plurality of screws 34. The confronting side edges 30 of the retaining members are provided with tapered cutouts 36 to receive screws 38 having tapered heads. By this arrangement, upon application of the screws 38, the retaining members are urged outwardly to press the blade B against the ring 24. In the present instance, stripper means is provided in the form of a pair of oval shaped strips 40, 40 preferably made of a spongy rubber-like material. The strips 40 are secured respectively around the periphery of the blade on either side thereof by means of a suitable adhesive and are of a height so that they extend slightly above the cutting edge of the blade as illustrated, for example in FIG. 14.

Considering now the operation of the die press, with the platen 16 in a retracted position as shown in FIG. 12, a workpiece P is positioned on the resilient anvil 14. Now, through suitable circuitry the hydraulic actuator H is actuated to move the platen to an extended position so that the cutting blade B engages through the workpiece P as illustrated in FIGS. 15 and 16. It is noted that as the platen moves downwardly against the workpiece, the strippers 40, 40 compress in the manner shown in FIG. 16 and the blade B cuts through the workpiece P and engages slightly into the resilient anvil 14. Now, when the platen 16 is retracted, the resilient strippers 40, 40 expand to strip the cut out blank and trim from the cutting edge of the blade B. Suitable means is provided to remove the blank so formed and trim from the platen and position another workpiece on the platen 16 in position to be cut or blanked in a continuous operation.

In accordance with the present invention, the cutting blade B is characterized by novel features of construction and arrangement providing for effective cutting and/or blanking of a workpiece such as a corrugated board or the like. More particularly, the specific arrangement of the cutting blade B of the present invention is such that trapping or embedding of fibers in the resilient anvil is minimized and damage to the cutting blade resulting from fibers forming fissures in the edge of the blade are eliminated. In general, by the specific construction of the blade B, the life of the blade is extended considerably and the downtime of the apparatus necessitated by replacement of the blade and/or the anvil is minimized.

To this end, the cutting blade B as best illustrated in FIGS. 1 through 5 inclusive, comprises a shank portion 41 and a cutting or working edge 43. The cutting edge 43 comprises a plurality of side by side teeth 50, each tooth 50 having an arcuate scallop-like cutting edge portion 52 terminating at opposite ends in a sharp point 51 where the adjacent teeth merge. By this arrangement as best illustrated in FIG. 1, the profile of the cutting edge 52 in side elevation comprises a plurality of equispaced sharp points 51 separated by arcuate scallop-like cutting edge portions 52. By this arrangement when the cutting edge engages the workpiece, the points 51 initially penetrate the workpiece and thereafter the arcuate scallop-like cutting edge portions cut into the workpiece. Further, by this construction of cutting blade B, there is no entrapment of fibers and/or creation of fissures in the cutting blade as was the case with the prior serrated cutting blades having the V-shaped teeth. The sides of each tooth 50 are defined by a generally flat tapered side face 54 and a generally rectangular indenture 56 in its opposite face which lies in a generally perpendicular plane and has a slanted or tapered edge 58 at the top thereof which is of a shorter depth and a more severe taper than the side face 54. Thus, with reference to FIG. 4, the cutting edge has an undulating or serpentine trace 62a in plan. Thus, the edge formed on a workpiece blade is slightly undulating so that is does not present a hazard to personnel handling the workpiece. The blade B further includes a plurality of keyhole slots 59 so that it may be readily bent to any desired shape when installed in a die press or other type of apparatus for cutting or blanking corrugated board or the like.

The steps in making cutting blade B in accordance with the present invention are illustrated in FIGS. 6–11 inclusive. As illustrated therein, a piece of steel stock 60 is initially ground defining a V-shaped edge 62 as illustrated in FIGS. 6 and 7. Thereafter the bar stock 60 adjacent the V-shaped edge 62 is deformed to the extent shown in FIGS. 9 and 10 so that the edge 62 defines a continuous serpentine or undulating path. Such deformation is accomplished by indenting the bar stock from opposite sides thereof to form indentures 56, 56 as indicated in FIG. 10, said indentures on the one side occurring in staggered spaced relation to those of the opposite side. As a result of this indenting the material of the bar thus displaced causes a corresponding arced protrusion 66 on the opposite face of the bar to each opposing indenture 56. This is clearly illustrated in FIGS. 8 to 11 inclusive wherein it will be clearly noted the width of the bar 60 is now slightly greater dimensionally in the area of the corrugated-like area than in the shank portion 41. It will also be noted with reference to FIGS. 9 and 11 that as a result of this working of the metal, the V-shaped edge 62 of the bar, though displaced laterally to each side of the central body of the bar, still lies in a truly horizontal plane.

With particular reference to FIG. 11, the bar 60 is now subjected to a grinding operation, each face respectively thereof being surface-ground in the plane of the line a—a longitudinally of the bar. It will be noted that the top of the line a—a intercepts a point midway between the adjacent sides of the bar and emerges at the sides thereof at a point sufficiently low enough to restore the bar to its original width or thickness (see FIG. 5). In so doing, the configuration of the edge 62 is changed from that shown in FIGS. 8 and 9 to that of FIGS. 3 and 4 showing the formation of cutting edges 51, 51 and 52, 52. The surfaces identified by reference characters 54, 54 and 58, 58 are flat and result directly from the grinding operation. The scallop-like profiles 52, 52 formed also during grinding result from the interception of plane a—a with undulating edge 62 of bar 60 (see FIG. 10). The grinding of the bar stock to form the V-shaped edge 62, the deforming of the edge 62 to form the indentures 56 and arced protrusions 66, and the final grinding to form the finished cutting edge of the blade B may be done by suitable means in a continuous operation to facilitate high speed production of the cutting blade B.

By this arrangement of cutting blade, it has been found that the problem of fiber entrapment in the blade which results in fissures and premature failure of the blade is obviated. Moreover, the particular configuration of the cutting blade B is such that the tendency to imbed or entrap fibers in the resilient anvil is practically eliminated thereby extending the life of the anvil considerably. Moreover, the slight undulation of the cutting edge of the blade as illustrated, particularly in FIG. 4, produces a slightly irregular or undulating cut on paper board or the like which presents less of a danger to persons handling the paper board.

While a particular embodiment of the present invention has been illustrated and described herein, it is to be understood that it is not intended to limit the invention to such disclosure and changes and modifications may be made therein within the scope of the following claims.

I claim:

1. A cutting blade for apparatus for cutting or blanking sheet material comprising an elongated flat bar having a shank portion and a V-shaped edge deformed to provide a plurality of notches and arced protrusions on each side forming a corrugated-like edge which when ground at an angle to the plane of the shank portion defines a cutting edge characterized by a plurality of side by side teeth, each tooth having an arcuate scallop-like cutting edge portion terminating at opposite ends in a sharp point, each tooth having a first flat tapered side face portion on one side and an indenture in the opposite side having a tapered side face portion smaller in depth than said first side face portion, alternate teeth having the indenture in one side face and the teeth between alternate teeth having the indenture in the opposite side face, whereby the cutting edge has serpentine trace in plan.

2. A cutting blade for apparatus for cutting or blanking sheet material comprising an elongated flat bar having a shank portion and an edge deformed to provide a plurality of notches and protrusions on each side forming a corrugated-like edge which when ground at an angle to the plane of the shank portion defines a cutting edge characterized by a plurality of side by side teeth, each tooth having an arcuate scallop-like cutting edge portion terminating at opposite ends in a sharp point, each tooth having a first flat tapered side face portion on one side and an indenture in the opposite side having a tapered side face portion smaller in depth than said first side face portion, alternate teeth having the indenture in one side face and the teeth between alternate teeth having the indenture in the opposite side face.

3. A cutting blade as claimed in claim 2 including a plurality of spaced keyhole slots in said shank portion extending inwardly from a side edge thereof opposite said cutting edge.

4. Apparatus for cutting or blanking sheet material comprising a stationary support, a resilient anvil mounted on said support, a platen, means for mounting a cutting blade in said platen and means operable for selectively actuating the platen relative to the anvil between a first position wherein the cutting blade engages a work piece on the anvil and a second retracted position, said cutting blade comprising an elongated flat bar having a shank portion and an edge deformed to provide a plurality of notches and protrusions on each side forming a corrugated-like edge which when ground at an angle to the plane of the shank portion defines a cutting edge characterized by a plurality of side by side teeth, each tooth having an arcuate scallop-like cutting edge portion terminating at opposite ends in a sharp point, each tooth having a first flat tapered side face portion on one side and an indenture in the opposite side having a tapered side face portion smaller in depth than said first side face portion, alternate teeth having the indenture in one side face and the teeth between alternate teeth having the indenture in the opposite side faces.

5. Apparatus as claimed in claim 4 including a resilient stripper surrounding said cutting blade which projects outwardly beyond the cutting edge thereof and is operable to strip the cut blank and the trim from the blade.

6. Apparatus for cutting or blanking sheet material comprising a stationary support, a resilient anvil mounted on said support, a platen, means for mounting a cutting blade in said platen and means operable for selectively actuating the platen relative to the anvil between a first position wherein the cutting blade engages a work piece on the anvil and a second retracted position, said cutting blade comprising an elongated flat bar having a shank portion and a V-shaped edge deformed to provide a plurality of notches and arced protrusions on each side forming a corrugated-like edge which when ground at an angle to the plane of the shank portion defines a cutting edge characterized by a plurality of side by side teeth, each tooth having an arcuate scallop-like cutting edge portion terminating at opposite ends in a sharp point, each tooth having a first flat tapered side face portion on one side and an indenture in the opposite side having a tapered side face portion smaller in depth than said first side face portion, alternate teeth having the indenture in one side face and the teeth between alternate teeth having the indenture in the opposite side face, whereby the cutting edge has a serpentine trace in plan.

References Cited by the Examiner

UNITED STATES PATENTS

| | | | |
|---|---|---|---|
| 455,015 | 6/1891 | Gilliland | 83—679 |
| 586,579 | 7/1897 | Van Praag | 83—679 |
| 922,926 | 5/1909 | Lynch | 76—107 |
| 1,082,985 | 12/1913 | Wilder et al. | 83—124 |
| 1,095,116 | 4/1914 | Kaven | 76—107 |
| 1,284,989 | 11/1918 | Bayer et al. | 83—679 |
| 1,793,171 | 2/1931 | Grant | 30—355 |
| 2,002,812 | 5/1935 | Hansen | 51—278 |
| 2,112,271 | 3/1938 | Dalkowitz | 76—104 |
| 2,596,851 | 5/1952 | Hansen | 30—355 X |
| 2,697,951 | 12/1954 | Muller | 76—104 |

FOREIGN PATENTS

| | | |
|---|---|---|
| 592,234 | 9/1947 | Great Britain. |

WILLIAM W. DYER, JR., *Primary Examiner.*

L. B. TAYLOR, *Assistant Examiner.*